United States Patent Office 3,736,316
Patented May 29, 1973

3,736,316
1,2,5-BENZOTRIAZEPIN-4-ONES AND
THEIR PREPARATION
Silvano Rossi, Milan, Italy, assignor to
Roussel-UCLAF, Paris, France
No Drawing. Continuation of application Ser. No.
709,824, Mar. 1, 1968. This application July 28,
1970, Ser. No. 59,025
Claims priority, application Italy, Mar. 7, 1967,
13,439/67
Int. Cl. C07d 33/54
U.S. Cl. 260—239.3 B                17 Claims

ABSTRACT OF THE DISCLOSURE

This invention relates to new heterocyclic compounds with polynitrogenic structure having the formula

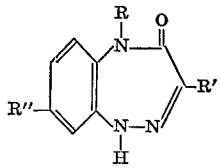

wherein R is hydrogen, an alkyl radical having from 1 to 6 carbon atoms, an aryl radical or an aralkyl radical having at most eight carbon atoms, a cycloalkyl radical having at most seven carbon atoms.

R′ is hydrogen, a carboxy group free or esterified with an alkanol having from 1 to 4 carbon atoms, a cyano group, a mercapto group having the general formula S—X (in which X represents an alkyl, aryl, aralkyl, carbalkoxy alkyl, carboxyalkyl, dialkylaminoalkyl, or an alkyleneaminoalkyl), an amino group having the formula

(in which $Z_1$ represents a hydrogen, an alkyl radical, a carbalkoxy group or an acyl group and $Z_2$ is hydrogen, or an alkyl radical) the radical

(Y is selected from the group consisting of amino, hydrazino, substituted hydrazino and guanidino or a halogen atom) and R″ is hydrogen, hydroxy, methoxy, a nitro group, a carbalkoxy group in which the alkyl radical has from 1 to 3 carbon atoms, a halogen or the trifluoromethyl group and their acid addition salts with a therapeutically compatible inorganic or organic acid. These compounds possess interesting tranquilizing properties and can be used in human or veterinary therapy for the treatment of mental illness or behaviour disorders.

This invention relates also to processes for producing said 1,2,5-benzotriazepine 4-ones which comprise the steps of (a) nitrosating a N-carbalkoxy acetyl or N-cyanacetyl o-phenylenediamine in acid medium,
(b) cyclising the diazonium salt thus formed to 3-cyano or 3-carbalkoxy 1H 4,5-dihydro 1,2,5-benzotriazepine 4-one,
(c) hydrolysing if desired in acidic or basic medium said benzotriazepine 4-one to 3-carboxy 1H 4,5-dihydro 1,2,5-benzotriazepine 4-one,
(d) decarboxylating, if desired, the 3-carboxylic compound by heating to 1H 4,5-dihydro 1,2,5-benzotriazepine 4-one,
(e) condensing, if desired, the 3-carboxylic or the 3-carbalkoxy compound with a primary amine, secondary amine, a substituted or unsubstituted hydrazine, or the guanidine to make the corresponding carbonamido compound,
(f) submitting, if desired, the said 3-carboxy compound either directly, either after thermal decarboxylation to the action of a halogenating agent and forming a 3-halogeno compound,
(g) reacting, if desired, the said 3-halogeno compound with a mercapto derivative having the general formula HS—X to form a 1H 4,5-dihydro 3(X-mercapto) 1,2,5-benzotriazepine 4-one,
(h) reacting, if desired, the said 3-halogeno compound with an amino derivative of the formula

to form the corresponding 1H 4,5-dihydro 3-($Z_1Z_2$ amino) 1,2,5-benzotriazepine 4-one.

The invention relates also to the new intermediates obtained during the process.

This application is a continuation of Ser. No. 709,824 filed Mar. 1, 1968 and now abandoned.

PRIOR ART

Prior synthesis of 1H 4,5-dihydrobenzo-1,2,4-triazepines are known but the structure of the formed compounds are uncertain owing to the fact that this cyclic structure is easily transposed to quinoxaline ring. The most recent study is the synthesis of Sparatore [Gazz. Chim. Italiane 85, 1 284 (1955) and 87, 1 014 (1957)]. This synthesis is very tedious and gives only hydrogenated compounds.

DESCRIPTION OF THE INVENTION

The present invention relates to new heterocyclic compounds having poly nitrogenic structure.

It concerns more specifically the 1,2,5-benzotriazepines, of general Formula I:

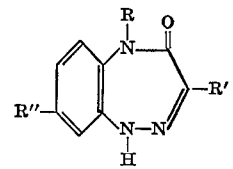

in which R represents a hydrogen atom, an alkyl radical containing 1 to 6 carbon atoms, an aryl or aralkyl radical containing at most 8 carbon atoms, or a cycloalkyl radical containing at most 7 carbon atoms, R′ represents a hydrogen atom, a carboxyl group—free or esterified by an aliphatic alcohol containing 1 to 4 carbon atoms—a cyano radical, a —S—X radical (X being an alkyl, aryl, aralkyl, carbalkoxyalkyl, carboxyalkyl, dialkylaminoalkyl or alkyleneaminoalkyl radical), a

radical ($Z_1$ being a hydrogen atom, an alkyl radical, a carbalkoxy radical or an acyl radical and $Z_2$ being a hydrogen atom or an alkyl radical), or a

radical, Y being an amino or hydrazino radical, substituted or not, or a guanidino radical, or a halogen.

And R″ represents a hydrogen atom, a hydroxy radical, a methoxy radical, a nitro radical, a carboxyl group esterified by an aliphatic alcohol containing 1 to 3 carbon atoms, a halogen atom or a trifluoromethyl radical, as well as the corresponding addition salts.

The substituent R represents for example a methyl, ethyl, propyl or butyl radical, a phenyl, tolyl or xylyl radical, a benzyl or phenethyl radical, a cyclopentyl or cyclohexyl radical.

The substituent —S—X represents for example a methyl-, ethyl- or propyl-mercapto, phenylmercapto, benzylmercapto, phenethylmercapto, dimethylaminoethylmercapto, 2-pyrrolidino-ethylmercapto, 3-piperidinopropylmercapto, carboxymethylmercapto, carboxyethylmercapto or carbethoxymethylmercapto radical.

The substituent Y represents for example a methylamino, dimethylamino, ethylamino, diethylamino, hydrazino, phenylhydrazino or guanidino radical.

The substituent

represents for example an amino, methylamino, diethylamino, ethylmethylamino, carbethoxyamino, carbopropyloxyamino, acetamido or propionylamino radical.

The halogen atom is an atom of chlorine, bromine or iodine.

The 1,2,5-benzotriazepines, object of the invention, present interesting pharmacological properties. They possess in particular a depressant action on the central nervous system. They manifest specifically anti-pyretic, anticonvulsant, sedative, analgesic and tranquillizing effects.

The compounds of the invention manifest tranquillizing effects at doses below those of Diazepam and possess a lower toxicity.

Among the 1,2,5-benzotriazepines, object of the invention, will be cited more especially:

3-carbethoxy-4-oxo-5-methyl-1H-4,5-dihydro-1,2,5-benzotriazepine
3-carbomethoxy-4-oxo-5-methyl-1H-4,5-dihydro-1,2,5-benzotriazepine
3-carbethoxy-4-oxo-5-methyl-8-chloro-1H-4,5-dihydro-1,2,5-benzotriazepine
3-carbethoxy-4-oxo-5-cyclohexyl-1H-4,5-dihydro-1,2,5-benzotriazepine
3-carbethoxy-4-oxo-5-phenyl-1H-4,5-dihydro-1,2,5-benzotriazepine
3-carbethoxy-4-oxo-5-benzyl-1H-4,5-dihydro-1,2,5-benzotriazepine
3-cyano-4-oxo-5-methyl-1H-4,5-dihydro-1,2,5-benzotriazepine
3-carboxy-4-oxo-5-methyl-1H-4,5-dihydro-1,2,5-benzotriazepine
3-carboxy-4-oxo-5-methyl-8-chloro-1H-4,5-dihydro-1,2,5-benzotrizepine
3-carboxy-4-oxo-5-cyclohexyl-1H-4,5-dihydro-1,2,5-benzotriazepine
3-carboxy-4-oxo-5-phenyl-1H-4,5-dihydro-1,2,5-benzotriazepine
3-carboxy-4-oxo-5-benzyl-1H-4,5-dihydro-1,2,5-benzotriazepine
4-oxo-5-methyl-1H-4,5-dihydro-1,2,5-benzotriazepine
4-oxo-5-cyclohexyl-1H-4,5-dihydro-1,2,5-benzotriazepine
4-oxo-5-methyl-8-chloro-1H-4,5-dihydro-1,2,5-benzotriazepine
4-oxo-5-phenyl-1H-4,5-dihydro-1,2,5-benzotriazepine
4-oxo-5-benzyl-1H-4,5-dihydro-1,2,5-benzotriazepine
3-guanidino-carbonyl-4-oxo-5-methyl-1H-4,5-dihydro-1,2,5-benzotriazepine
3-carbazoyl-4-oxo-5-methyl-1H-4,5-dihydro-1,2,5-benzotriazepine
3-bromo-4-oxo-5-methyl-1H-4,5-dihydro-1,2,5-benzotriazepine
3-bromo-4-oxo-5-methyl-8-chloro-1H-4,5-dihydro-1,2,5-benzotriazepine
3-benzylmercapto-4-oxo-5-methyl-1H-4,5-dihydro-1,2,5-benzotriazepine
3-carbethoxymethylmercapto-4-oxo-5-methyl-1H-4,5-dihydro-1,2,5-benzotriazepine
3-dimethylaminoethylmercapto-4-oxo-5-methyl-1H-4,5-dihydro-1,2,5-benzotriazepine
3-carboxymethylmercapto-4-oxo-5-methyl-1H-4,5-dihydro-1,2,5-benzotriazepine
3-ethoxycarbonylamino-4-oxo-5-methyl-1H-4,5-dihydro1,2,5-benzotriazepine
3-amino-4-oxo-5-methyl-1H-4,5-dihydro-1,2,5-benzotriazepine
3-amino-4-oxo-5-methyl-8-chloro-1H-4,5-dihydro-1,2,5-benzotriazepine The present invention has also as an object a process for preparing the said 1,2,5-benzotriazepines.

The chemical literature reports only a few examples of preparing 1,2,5-benzotriazepines.

W. Perkin et al., J. Chem. Soc., 2408 (1923), have attributed the structure of 3,4 - cyclotetramethylene-1H-4,5 - dihydro - 1,2,5 - benzotriazepine to the reduction product of the o-nitrophenylhydrazine of cyclohexanone. But the studies of F. Sparatore, Gazzetta, 85, 1098 (1955), have shown that the product obtained would rather be an o-cyclohexenylhydrazino-aniline.

P. C. Guha et al., Quart. J. Indian Chem. Soc., 3, 41 (1926) (Chem. Zentr., 1926, II, 212) have prepared, by condensation of o-aminophenylhydrazine on the α-dicarbonylated compounds, derivatives to which they attributed the structure of 2,3-benzo-1,4,5-heptatriazines. Analogous derivatives would have been prepared by reduction of the o-nitrophenylmonohydrazone of α-dicarbonylated compounds. However, the study of F. Sparatore, Gazzetta, 85, 1284 (1955) and Gazzetta, 87, 1014 (1957), has shown that the condensation of the o-aminophenylhydrazine on the α-dicarbonylated compounds leads to quinoxaline derivatives and not to benzotriazepines.

The only known method for preparing 1,2,5-benzotriazepines was thus that described by F. Sparatore, Gazzetta, 85, 1284 (1955) and 87, 1014 (1957) which consists in a reduction by zinc in acetic acid of the compound of formula:

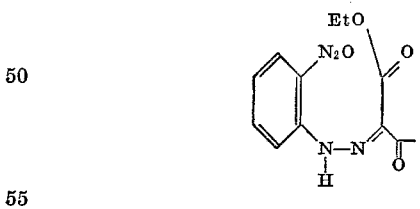

This reduction provides, among other derivatives, a benzotriazepine of formula:

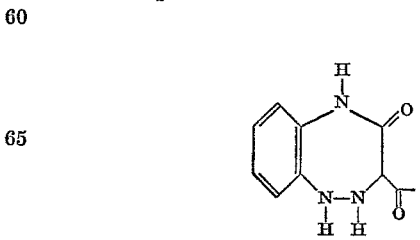

This method presents little practical value, given the difficulty of obtaining the starting hydrazine. It does not allow of obtaining derivatives carrying different substituents at the 3- and 5-positions.

To prepare the 1,2,5-benzotriazepines of general formula:

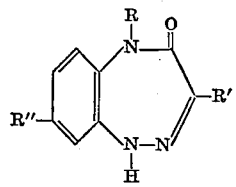

in which R' represents a hydrogen atom, a cyano radical or a carboxyl group, free or esterified by an aliphatic alcohol containing 1 to 4 carbon atoms, one causes a nitrosating agent to act on an N-carbalkoxyacetyl or N-cyanacetyl o-phenylenediamine, of general formula:

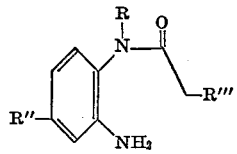

in which R and R" have the meanings previously provided and R''' represents a cyano radical or a carboxyl group esterified by an aliphatic alcohol containing 1 to 4 carbon atoms, to form the corresponding diazonium salt which one cyclizes, at a pH greater than 4, into 3-cyano or 3-carbalkoxy-4-oxo-1H-4,5 - dihydro - 1,2,5-benzotriazepine, of general formula:

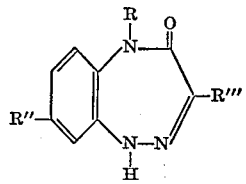

in which the substituents R, R" and R''' retain the meanings provided above, eventually hydrolyzes the latter by the action of an acid or alkaline agent into a 3-carboxy-4-oxo-1H - 4,5 - dihydro - 1,2,5 - benzotriazepine, of general formula:

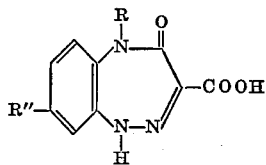

which one possibly subjects to a decarboxylation by heating to obtain a 4 - oxo - 1H - 4,5 - dihydro-1,2,5-benzotriazepine, of general formula:

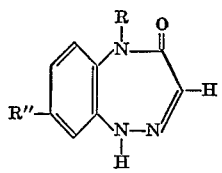

To prepare the 1,2,5-bezotriazepines of Formula III, in which Y is defined as previously, one causes a nitrosating agent to act on an N-carbalkoxy-acetyl o-phenylenediamine, of general formula:

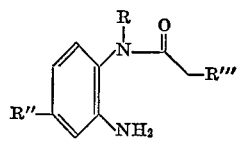

in which R and R" have the meanings provided previously and R''' represents a carboxyl group esterified by an aliphatic alcohol containing 1 to 4 carbon atoms, to form the corresponding diazonium salt which one cyclizes, at a pH value greater than 4, into a 3-carbalkoxy-4-oxo-1H-4,5-dihydro-1,2,5-benzotriazepine, of general formula:

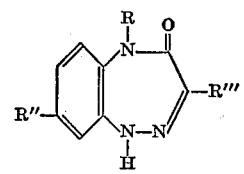

in which R''' has the same meaning as above, causes the latter to react with a primary or secondary amine, a hydrazine, substituted or not, or guanidine, to obtain a 4-oxo - 1H - 4,5-dihydro-1,2,5-benzotriazepine, of general Formula III:

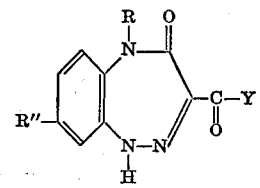

(III)

To prepare the 1,2,5-benzotriazepines, of general Formula IV, one causes a nitrosating agent to react on an N-carbalkoxyacetyl or N-cyanacetyl o-phenylenediamine, of general formula:

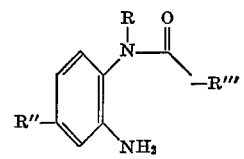

in which R''' represents a cyano radical or a carboxyl group esterified by an aliphatic alcohol containing 1 to 4 carbon atoms, to form the corresponding diazonium salt which one cyclizes, at a pH value greater than 4, into 3-cyano or 3-carbalkoxy - 4 - oxo - 1H-4,5-dihydro-1,2,5-benzotriazepine, of general formula:

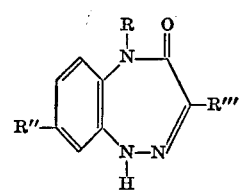

in which R''' is defined as previously, hydrolyzes the latter, by the action of an acid or alkaline agent, into a 3-carboxy-4-oxo-1H-4,5-dihydro-1,2,5-benzotriazepine, of general formula:

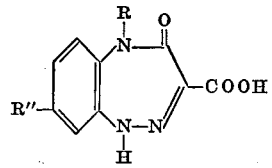

subjects this latter, either directly, or after decarboxylation by heating, to the action of a halogenating agent to obtain a 3-halogeno-4-oxo-1H-4,5 - dihydro - 1,2,5-benzotriazepine, of general Formula IV:

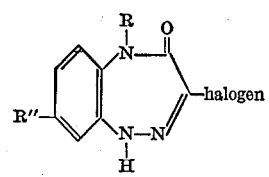

(IV)

In a variant, one prepares a 3-iodo-4-oxo-1H-4,5-dihydro-1,2,5-benzotriazepine, of general formula:

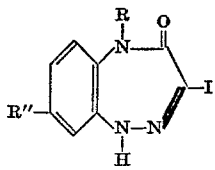

starting from a corresponding 3-chloro derivative, by the action of an alkali-metal iodide.

To prepare the 1,2,5-benzotriazepines of general Formula VI, one causes a nitrosating agent to react on an N-carbalkoxyacetyl or N-cyanacetyl o-phenylenediamine, of general formula:

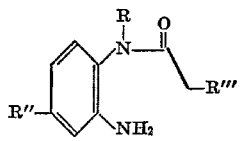

in which R''' represents a cyano radical or a carboxyl group esterified by an aliphatic alcohol containing 1 to 4 carbon atoms, to form the corresponding diazonium salt which one cyclizes, at a pH value greater than 4, into 3-cyano or 3-carbalkoxy-4-oxo - 1H - 4,5 - dihydro-1,2,5-benzotriazepine, of general formula:

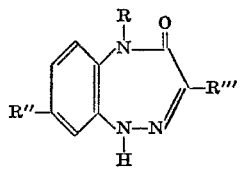

in which R''' is defined as above, hydrolyzes the latter by action of an acid or alkaline agent into a 3-carboxy-4-oxo-1H-4,5-dihydro-1,2,5-benzotriazepine, of the general formula:

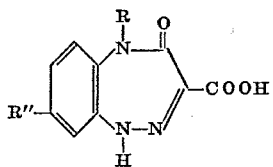

subjects this last, either directly or after decarboxylation by heating, to the action of a halogenating agent to obtain a corresponding 3-halogeno-4-oxo-1H-4,5-dihydro - 1,2,5-benzotriazepine, which one causes to react with a mercaptan of formula HS—X, X being defined as previously, to obtain a 4-oxo-1H-4,5-dihydro-1,2,5-benzotriazepine, of general Formula VI:

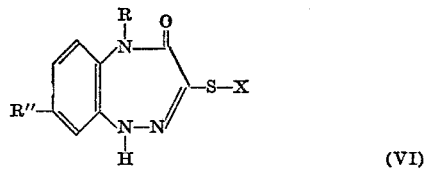

(VI)

To prepare the 1,2,5-benzotriazepines of general Formula V, one causes a nitrosating agent to react on an N-carbalkoxyacetyl or N-cyanacetyl o-phenylenediamine. of general formula:

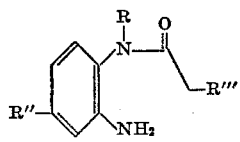

in which R''' represents a cyano radical or a carboxyl group esterified by an aliphatic alcohol containing 1 to 4 carbon atoms, to obtain the corresponding diazonium salt which one cyclizes, at a pH value greater than 4, into 3-cyano or 3-carbalkoxy-4-oxo-1H-4,5-dihydro-1,2,5-benzotriazepine, of general formula:

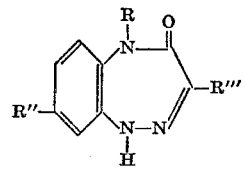

in which R''' has the same meaning as above, hydrolyzes the latter by the action of an acid or alkaline agent into a 3-carboxy-4-oxo-1H-4,5-dihydro-1,2,5 - benzotriazepine, of general formula:

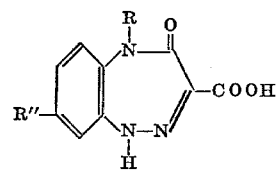

which one subjects, either directly, or after decarboxylation by heating, to the action of a halogenating agent, to obtain a corresponding 3-halogeno-4-oxo-1H-4,5-dihydro-1,2,5-benzotriazepine, and causes this last to react with ammonia, a primary or secondary amine, an amide or an urethane to obtain a 4-oxo-1H-4,5-dihydro-1,2,5 - benzotriazepine, of general Formula V:

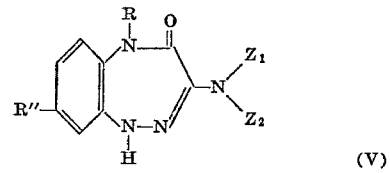

(V)

The above processes are characterized by the following points, taken separately or in combination:

(a) the nitrosating agent is an alkali-metal nitrite in the presence of a mineral acid;
(b) the alkali-metal nitrite is a nitrite of sodium or of potassium;
(c) the nitrosating agent is nitrous anhydride in an aqueous medium;
(d) the nitrosating agent is nitric oxide;
(e) the nitrosating agent is an ester of nitrous acid;
(f) the ester of nitrous acid is ethyl nitrite or amyl nitrite;
(g) the diazotation reaction is effected at a temperature below the normal temperature;
(h) the diazotation reaction is effected between —5 and +5° C.;
(i) the cyclization reaction is effected in the reaction medium of the diazotation reaction, without recourse to the isolation of the diazonium salt;
(j) if necessary, one brings the pH value to a level higher than 4 by adding a buffer agent;
(k) the buffer agent is the acetate or phosphate of sodium;
(l) the hydrolysis, by means of an acid or alkaline agent, is effected in an aliphatic alcohol miscible with water;
(m) the acid agent is a mineral acid;
(n) the alkaline agent is an alkali-metal hydroxide;
(o) the halogenation agent is bromine or iodine;
(p) the halogenation agent is the oxychloride or the oxybromide of phosphorus, or phosphorous tribromide;
(q) the halogenation agent is sulphuryl chloride;
(r) the halogenation agent is N-chloro or N-bromosuccinimide.

The invention includes besides, as new intermediate compounds, the diazonium salts of N-carbalkoxyacetyl or N-cyanacetyl o-phenylenediamines, of general formula:

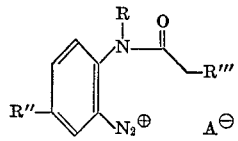

in which A⊖ represents an anion derived from a mineral acid, organic acid, or from a Lewis acid R represents as hydrogen atom or an alkyl radical containing 1 to 6 carbon atoms, an aryl or aralkyl radical containing at most 8 carbon atoms, or a cycloalkyl radical containing at most 7 carbon atoms, R''' represents a cyano radical or a carboxyl group esterified by an aliphatic alcohol containing 1 to 4 carbon atoms, And R'' represents a hydrogen atom, a hydroxy radical, a methoxy radical, a nitro radical, a carboxyl group esterified by an aliphatic alcohol containing 1 to 3 carbon atoms, a halogen atom or a trifluoromethyl radical.

The starting products of general Formula II, in which R and R'' are defined as previously, and R''' represents a carboxyl group esterified by an aliphatic alcohol containing 1 to 4 carbon atoms, are prepared by condensing a corresponding o-nitroaniline with a halide of mono alkyl malonic ester thus forming a N-carbalkoxyacetyl o-nitro aniline and reducing the latter into a N-carbalokoxy-acetyl o-phenylenediamine.

To prepare the starting products of general Formula II in which R''' represents a cyano group, one condenses an o-nitro aniline, of general formula:

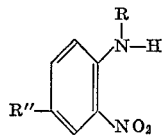

in which R and R'' are defined as previously, with cyanacetic acid or a functional derivative thereof, to form an o-nitro N-cyanacetyl aniline, of general formula:

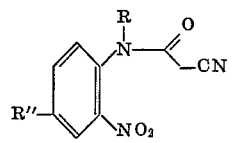

subjects this last to the action of a reducing agent and obtains an N-cyanacetyl o-phenylenediamine, of general formula:

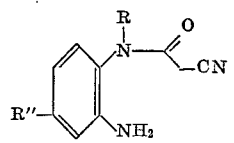

The N-cyanacetyl o-phenylenediamines of Formula II are new products; they form part of the invention, as also their process of preparation.

EXAMPLE I 3-carbethoxy - 4 - oxo - 5 - methyl - 1H - 4,5 - dihydro-1,2,5-benzotriazepine (Formula I, with R=CH₃; R'=COOC₂H₅; R''=H)

One adds 270 cc. of aqueous solution of a 3% aqueous solution of hydrochloric acid, cooled to −5° C., to a solution of 6.5 g. of sodium nitrite in 25 cc. of water, without allowing the temperature to rise. One adds in about 10 minutes, while agitating, 20.5 g. of N-carbethoxyacetyl-N-methyl-o-phenylenediamine (Formula II, with R=CH₃; R''=H, R'''=COOC₂H₅). One leaves the reaction mixture for one hour under agitation, maintaining the temperature below 0° C., then overnight at room temperature. The suspension thus obtained is extracted with chloroform; the extracts are dried on sodium sulphate then evaporated. The residue is purified by crystallization in 70 cc. of xylene, filtering in vacuo and washing with petroleum ether. One obtains 15.5 g. of 3-carbethoxy-4-oxo-5-methyl-1H-4,5-dihydro - 1,2,5 - benzotriazepine, M.P.=182–183° C.

*Analysis.*—Calculated for $C_{12}H_{13}N_3O_3$ (percent): C, 58.29; H, 5.30; N, 17.00. Found (percent): C, 58.41; H, 5.23; N, 17.10.

Operating according to the technique of the previous example, the following compounds are prepared:

EXAMPLE 2

3-carbomethoxy - 4 - oxo - 5 - methyl - 1H - 4,5 - dihydro-1,2,5-benzotriazepine (Formula I, with R=CH₃; R'=COOCH₃; R''=H)

This compound, obtained starting from N-carbomethoxyacetyl-N-methyl-o-phenylenediamine (Formula II, with R=CH₃; R''=H; R'''=COOCH₃), and recrystallized in xylene, melts at 194–196° C.

*Analysis.*—Calculated for $C_{11}H_{11}N_3O_3$ (percent): C, 56.65; H, 4.75; N, 18.02. Found (percent): C, 56.77; H, 4.84; N, 18.10.

EXAMPLE 3

3-carbethoxy - 4 - oxo - 5 - methyl - 8 - chloro-1H-4,5-dihydro - 1,2,5 - benzotriazepine (Formula I, with R=CH₃; R'=COOC₂H₅; R''=Cl)

This compound, obtained starting from N-carbethoxyacetyl-N-methyl-2-amino-4-chloroaniline (Formula II, with R=CH₃; R''=Cl, R'''=COOC₂H₅), and recrystallized in xylene, melts at 204–206° C.

*Analysis.*—Calculated for $C_{12}H_{12}ClN_3O_3$ (percent): C, 51.16; H, 4.29; N, 14.92. Found (percent): C, 52.57; H, 4.76; N, 15.31.

EXAMPLE 4

3-carbethoxy - 4 - oxo - 5 - cyclohexyl - 1H - 4,5 - dihydro-1,2,5-benzotriazepine (Formula I, with R=C₆H₁₁; R'=COOC₂H₅; R''=H)

This compound, obtained starting from N-carbethoxyacetyl-N-cyclohexyl-o-phenylenediamine (Formula II, with R=C₆H₁₁; R''=H; R'''=COOC₂H₅), and recrystallized in xylene, melts at 181–183° C.

*Analysis.*—Calculated for $C_{17}H_{21}N_3O_3$ (percent): C, 64.74; H, 6.71; N, 13.33. Found (percent): C, 65.10; H, 6.55; N, 13.37.

EXAMPLE 5

3-carbethoxy - 4 - oxo - 5 - phenyl - 1H - 4,5 - dihydro-1,2,5-benzothiazepine (Formula I, with R=C₆H₅; R'=COOC₂H₅; R''=H)

This compound, obtained starting from N-carbethoxyacetyl-N-phenyl-o-phenylenediamine (Formula II, with R=C₆H₅; R''=H; R'''=COOC₂H₅), and recrystallized in 95% ethanol, melts at 185–187° C.

*Analysis.*—Calculated for $C_{17}H_{15}N_3O_3$ (percent): C, 66.01; H, 4.89; N, 13.59. Found (percent): C, 65.77; H, 4.82; N, 13.79.

EXAMPLE 6

3-carbethoxy - 4 - oxo - 5 - benzyl - 1H - 4,5 - dihydro-1,2,5-benzotriazepine (Formula I, with R=CH₂—C₆H₅; R'=COOC₂H₅; R''=H)

This compound, obtained starting from N-carbethoxyacetyl-N-benzyl-o-phenylenediamine (Formula II, with R=CH₂—C₆H₅; R'''=COOC₂H₅; R''=H), and recrystallized in xylene, melts at 160–161° C.

*Analysis.*—Calculated for $C_{18}H_{17}N_3O_3$ (percent): C, 66.86; H, 5.30; N, 13.00. Found (percent): C, 66.94; H, 5.35; N, 13.02.

EXAMPLE 7

3-cyano - 4 - oxo - 5 - methyl - 1H - 4,5 - dihydro - 1,2,5-benzotriazepine (Formula I, with R=$CH_3$; R'=CN; R''=H)

One dissolves 10.5 g. of N-cyanoacetyl-N'-methyl-o-phenylenediamine (Formula II, with R=$CH_3$; R''=H; R'''=CN) in 130 cc. of water containing 11 cc. of concentrated hydrochloric acid; one cools to 0° C. and adds in 2–3 minutes a solution of 3.9 g. of sodium nitrite in 50 cc. of water. One leaves under agitation at 4–5° C. then filters off the precipitate in vacuo and recrystallizes it in xylene then in isopropyl alcohol. One obtains 3-cyano-4-oxo-methyl - 1H-4,5 - dihydro - 1,2,5 - benzotriazepine; M.P.=165–166° C.

*Analysis.*—Calculated for $C_{10}H_8N_4O$ (percent): C, 59.99; H, 4.03; N, 27.99. Found (percent): C, 59.85; H, 4.26; N, 27.70.

EXAMPLE 8

3-carboxy-4-oxo - 5 - methyl-1H-4,5-dihydro-1,2,5-benzotriazepine (Formula I, with R=$CH_3$; R'=COOH; R''=H)

One introduces 2 g. of 3-carbethoxy-4-oxo-5-methyl-1H-4,5-dihydro-1,2,5-benzotriazepine, obtained in Example 1, in 50 cc. of 50% methanol and 2 cc. of 30% solution of caustic soda. One agitates and heats genetly to 40° C., then dilutes the solution thus obtained with 20 cc. of water. One leaves for 20 minutes at ambient temperature then acidifies with concentrated hydrochloric acid. The precipitate is filtered in vacuo and recrystallized in isopropanol. One obtains 1.5 g. of 3-carboxy-4-oxo-5-methyl-1H-4,5-dihydro-1,2,5-benzotriazepine; M.P.=158–159° C. (decomposition).

*Analysis.*—Calculated for $C_{10}H_9N_3O_3$ (percent): C, 54.79; H, 4.14; N, 19.17. Found (percent): C, 54.92; H, 4.00; N, 19.35.

By hydrolyzing 3-cyano-4-oxo-5-methyl-1H-4,5-dihydro-1,2,5-benzotriazepine, obtained in Example 7, with caustic soda in hydro-alcoholic solution, one obtains 3-carboxy-4-oxo - 5 - methyl-1H-4,5-dihydro-1,2,5-benzotriazepine, identical with the compound obtained above.

EXAMPLE 9

3-carboxy - 4 - oxo-5-methyl-8 - chloro-1H-4,5-dihydro-1,2,5-benzotriazepine (Formula I, with R=$CH_3$; R'=COOH; R''=Cl)

One places in suspension 1 g. of 3-carbethoxy-4-oxo-5-methyl-8-chloro-1H-4,5 - dihydro-1,2,5-benzotriazepine, obtained in Example 3, in 50% ethanol and adds, while agitating, 1 cc. of 30% solution of caustic soda. One leaves under agitation for 2 hours at ambient temperature. One acidifies with dilute hydrochloric acid. The percipitate is filtered off in vacuo and purified by crystallization in 70% ethanol. One obtains 3-carboxy-4-oxo-5-methyl-8-chloro-1H-4,5 - dihydro-1,2,5-benzotriazepine; M.P.=157–159° C.

*Analysis.*—Calculated for $C_{10}H_8ClN_3O_3$ (percent): C, 47.35; H, 3.18; N, 16.57. Found (percent): C, 47.40; H, 3.40; N, 16.60.

Operating according to the technique of Examples 8 or 9, the following compounds are prepared:

3-carboxy-4-oxo-5-cyclohexyl - 1H - 4,5-dihydro-1,2,5-benzotriazepine (Formula I, with R=$C_6H_{11}$);

R'=COOH

R''=H) crystallized in 60% ethanol. M.P.=160–161° C. (decomposition).

*Analysis.*—Calculated for $C_{15}H_{17}N_3O_3$ (percent): C, 62.70; H, 5.96; N, 14.63. Found (percent): C, 62.43; H, 6.14; N, 14.43.

3-carboxy-4-oxo-5-phenyl-1H-4,5-dihydro - 1,2,5-benzotriazepine (Formula I, with R=$C_6H_5$; R'=COOH; R''=H) crystallized in 95% ethanol. M.P.=160–161° C. (decomposition).

*Analysis.*—Calculated for $C_{15}H_{11}N_3O_3$ (percent): C, 64.05; H, 3.94; N, 14.94. Found (percent): C, 64.06; H, 3.86; N, 14.80.

3-carboxy-4-oxo-5-benzyl - 1H-4,5-dihydro-1,2,5-benzotriazepine (Formula I, with R=$CH_2$—$C_6H_5$;

R'=COOH

R''=H) crystallized in isopropanol. M.P.=140–142° C. (decomposition).

*Analysis.*—Calculated for $C_{16}H_{13}N_3O_3$ (percent): C, 65.07; H, 4.44. Found (percent): C, 64.83; H, 6.27.

EXAMPLE 10

4-oxo-5-methyl-1H-4,5-dihydro-1,2,5-benzotriazepine (Formula I, with R=$CH_3$; R'=R''=H)

One heats at 150–160° C., under a pressure of 1 mm. of mercury, 3.1 g. of 3-carboxy-4-oxo-5-methyl-1H-4,5-dihydro-1,2,5-benzotriazepine. When the release of carbon gas has ceased, one distills off the residue at 162–163° C. (1 mm. Hg). The distillate is purified by crystallization in toluene. One obtains 2.5 g. of 4-oxo-5-methyl-1H-4,5-dihydro-1,2,5-benzotriazepine; M.P.=119–121° C.

*Analysis.*—Calculated for $C_9H_9O_3$ (percent): C, 61.70; H, 5.18; N, 23.99. Found (percent): C, 61.95; H, 5.17; N, 23.90.

EXAMPLE 11

4-oxo-5-cyclohexyl-1H-4,5-dihydro-1,2,5-benzotriazepine (Formula I, with R=$C_6H_{11}$; R'=R''=H)

One heats at 120–130° C., in the absence of solvent, 5 g. of 3-carboxy-4-oxo-5-cyclohexyl-1H-4,5-dihydro-1,2,5-benzotriazepine. The residue is taken up in 70 cc. of ethanol and one heats for 5 minutes at reflux, treats with animal charcoal, filters in the hot, dilutes the filtrate with 50 cc. of water and allows to crystallize. One obtains 4-oxo-5-cyclohexyl - 1H-4,5-dihydro-1,2,5-benzotriazepine; M.P.=135–137° C.

*Analysis.*—Calculated for $C_{14}H_{17}N_3O$ (percent): C, 69.11; H, 7.04; N, 17.27. Found (percent): C, 69.03; H, 7.21; N, 17.28.

Operating according to the technique of Examples 10 or 11, the following compounds are prepared: 4-oxo-5-methyl-8-chloro - 1H - 4,5-dihydro-1,2,5-benzotriazepine (Formula I, with R=$CH_3$; R'=H; R''=Cl) crystallized in 50% ethanol M.P.=128–130° C.

*Analysis.*—Calculated for $C_9H_8ClN_3O$ (percent): C, 51.56; H, 3.85; N, 20.05. Found (percent): C, 51.52; H, 4.09; N, 20.25.

4-oxo-5-phenyl - 1H-4,5-dihydro-1,2,5-benzotriazepine (Formula I, with R=$C_6H_5$; R'=R''=H) crystallized in isopropanol+petroleum ether M.P.=158–160° C.

*Analysis.*—Calculated for $C_{14}H_{11}N_3O$ (percent): C, 70.87; H, 4.67; N, 17.71. Found (percent): C, 70.90; H, 4.75; N, 17.56.

4-oxo-5-benzyl - 1H-4,5-dihydro-1,2,5-benzotriazepine (Formula I, with R=$CH_2$—$C_6H_5$; R'=R''=H) crystallized in xylene M.P.=148–150° C.

*Analysis.*—Calculated for $C_{15}H_{13}N_3O$ (percent): C, 71.69; H, 5.22; N, 16.72. Found (percent): C, 71.47; H, 5.48; N, 16.63.

EXAMPLE 12

3 - bromo - 4 - oxo - 5 - methyl-1H-4,5-dihydro-1,2,5-benzotriazepine (Formula I, with R=$CH_3$; R'=Br; R''=H)

One introduces 17 g. of 4-oxo-5-methyl-1H-4,5-dihydro-1,2,5-benzotriazepine into 80 cc. of an aqueous solution containing 10 g. of caustic soda. One adds slowly, while agitating, 2.6 cc. of bromine and continues agitating for half-an-hour at ambient temperature. One neutralizes the reaction mixture with hydrochloric acid, filters off the precipitate and washes it with water. By recrystallization in isopropanol, one obtained 3-bromo-4-oxo-5-methyl-1H-4,5-dihydro-1,2,5-benzotriazepine; M.P.=166–168° C.

13

*Analysis.*—Calculated for $C_9H_8BrN_3O$ (percent): C, 42.54; H, 3.17; N, 16.54. Found (percent): C, 42.46; H, 3.29; N, 16.35.

Operating according to the preceding technique, one obtains, starting from 4 - oxo - 5 - methyl - 8 - chloro-1H-4,5 - dihydro - 1,2,5 - benzotriazepine, 3-bromo-4-oxo-5-methyl-8-chloro-1H-4,5-dihydro-1,2,5-benzotriazepine.

By action of bromine in acetic acid on 3-carboxy-4-oxo-5 - methyl - 8 - chloro - 1H - 4,5 - dihydro-1,2,5 - benzotriazepine and heating at reflux, one obtains 3 - bromo-4 - oxo - 5 - methyl - 8 - chloro - 1H - 4,5 - dihydro-1,2,5-benzotriazepine identical with the compound obtained above.

EXAMPLE 13

3 - benzylmercapto - 4 - oxo - 5 - methyl-1H-4,5-dihydro-1,2,5 - benzotriazepine (Formula I, with $R=CH_3$; $R'=-S-CH_2C_6H_5$; $R''=H$)

One adds, while agitating, 5 g. of 3 - bromo-4-oxo-1H-4,5-dihydro-1,2,5-benzotriazepine to a solution of benzylmercaptan (potassium salt) obtained by action of dilute caustic potash on 2.5 g. of benzylmercaptan. One agitates for two hours at ambient temperature then neutralizes to pH 7 by adding dilute hydrochloric acid. One continues agitating for one hour, separates off the precipitate by filtering and washes it with water. By recrystallization in isopropanol, one obtains 3 - benzyl - mercapto-4-oxo-5-methyl - 1H - 4,5 - dihydro - 1,2,5 - benzotriazepine; M.P.=124–125° C.

*Analysis.*—Calculated for $C_{16}H_{15}N_3OS$ (percent): C, 64.62; H, 5.08; N, 14.13. Found (percent): C, 64.47; H, 5.32; N, 14.00.

EXAMPLE 14

3 - carbethoxymethylmercapto - 4 - oxo-5-methyl-1H-4,5 - dihydro - 1,2,5 - benzotriazepine (Formula I, with $R=CH_3$; $R'=-S-CH_2COOC_2H_5$; $R''=H$).

Operating as in the previous example one obtains, by the action of ethyl mercapto-acetate on 3-bromo-4-oxo-5-methyl - 1H - 4,5 - dihydro - 1,2,5 - benzotriazepine, 3-carbethoxymethylmercapto - 4 - oxo - 5 - methyl - 1H-4,5-dihydro-1,2,5-benzotriazepine which, recrystallized in isopropanol, melts at 135–138° C.

*Analysis.*—Calculated for $C_{13}H_{15}N_3O_3S$ (percent): C, 53.23; H, 5.15; N, 14.33. Found (percent): C, 52.88; H, 5.27; N, 14.54.

Operating as previously, one obtains, by the action of dimethylaminoethylmercaptan, 3 - dimethylaminoethylmercapto - 4 - oxo - 5 - methyl - 1H-4,5-dihydro-1,2,5-benzotriazepine.

EXAMPLE 15

3 - (carboxymethylmercapto) - 4 - oxo - 5 - methyl-1H-4,5 - dihydro - 1,2,5 - benzotriazepine (Formula I, with $R=CH_3$; $R'=S-CH_2COOH$; $R''=H$)

One introduces 10 g. of 3 - bromo - 4 - oxo-5-methyl-1H-4,5-dihydro-1,2,5-benzotriazepine into 120 cc. of water and 50 cc. of concentrated ammonia, and adds 4 g. of thioglycolic acid. One leaves for 24 hours at ambient temperature. By adding isopropyl alcohol, one brings about the precipitation of 3-(carboxymethylmercapto)-4-oxo - 5 - methyl - 1H - 4,5 - dihydro - 1,2,5 - benzotriazepine in the form of ammonium salt. By adding hydrochloric acid, one obtains the free acid; M.P.=173–175° C.

*Analysis.*—Calculated for $C_{11}H_{11}N_3O_3S$ (percent): C, 49.80; H, 4.18; N, 15.84. Found (percent): C, 49.62; H, 4.09; N, 15.54.

Starting from the acid, one prepares the sodium salt; M.P.≃215° C.

EXAMPLE 16

3 - guanidinocarbonyl - 4 - oxo - 5 - methyl - 1H-4,5-dihydro - 1,2,5 - benzotriazepine (Formula I, with $R=CH_3$;

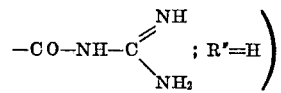
; $R'=H$)

One heats at 100° C. for one hour 3 g. of 3-carbethoxy-4 - oxo - 5 - methyl - 1H - 4,5-dihydro-1,2,5-benzotriazepine and 1 g. of guanidine in dimethylformamide. One concentrates the reaction mixture to small volume and pours it into water. By filtering off the precipitate, one obtains 3 - guanidinocarbonyl - 4 - oxo - 5 - methyl-1H-4,5-dihydro-1,2,5-benzotriazepine; M.P.>300° C.

*Analysis.*—Calculated for $C_{11}H_{12}N_6O_2$ (percent): C, 50.77; H, 4.65; N, 32.30. Found (percent): C, 49.84; H, 4.75; N, 31.32.

EXAMPLE 17

3 - carbazoyl - 4 - oxo - 5 - methyl - 1H - 4,5-dihydro-1,2,5 - benzotriazepine (Formula I, with $R=CH_3$; $R'=-CO-NH-NH_2$; $R''=H$)

Operating according to the technique of the preceding example, one obtains, starting from 3 - carbethoxy-4-oxo-5-methyl-1H-4,5-dihydro-1,2,5-benzotriazepine and hydrazine, 3-carbazoyl-4-oxo - 5 - methyl - 1H - 4,5 - dihydro-1,2,5-benzotriazepine which, recrystallized in ethanol at 95°, melts at 186–188° C. with decomposition.

*Analysis.*—Calculated for $C_{10}H_{11}N_5O_2$ (percent): C, 51.50; H, 4.75; N, 30.00. Found (percent): C, 51.69; H, 4.79; N, 30.32.

EXAMPLE 18

3 - ethoxycarbonylamino - 4 - oxo - 5 - methyl - 1H - 4,5-dihydro - 1,2,5 - benzotriazepine (Formula I, with $R=CH_3$; $R'=-NH-COOC_2H_5$; $R''=H$)

One introduces 4 g. of 3-bromo-4-oxo-5-methyl-1H-4,5-dihydro-1,2,5-benzotriazepine into 40 cc. of ethanol and adds, while agitating, a solution of 1.4 g. of urethane in ethanol. One continues agitating for 30 minutes then evaporates to dryness in vacuo. The residue is washed with water, dried and recrystallized in isopropyl alcohol. One obtains 3-ethoxycarbonylamino-4-oxo-5-methyl-1H-4,5-dihydro-1,2,5-benzotriazepine, melting at 204–205° C.

*Analysis.*—Calculated for $C_{12}H_{14}N_4O_3$ (percent): C, 54.95; H, 5.38; N, 21.36. Found (percent): C, 55.16; H, 5.44; N, 21.62.

EXAMPLE 19

3 - amino - 4 - oxo - 5 - methyl - 1H - 4,5 - dihydro-1,2,5 - benzotriazepine (Formula I, with $R=CH_3$; $R'=NH_2$; $R''=H$)

One introduces into 15 cc. of ethanol 1 g. of 3-bromo-4 - oxo - 5 - methyl - 1H - 4,5 - dihydro - 1,2,5-benzotriazepine, adds 4 cc. of concentrated ammonia and agitates the mixture for one hour. One evaporates to dryness in vacuo, takes up the residue in water and filters off the precipitate. One obtains 3-amino-4-oxo-5-methyl-1H-4,5-dihydro-1,2,5-benzotriazepine.

Operating according to the preceding technique, one obtains, starting from 3-bromo-4-oxo-5-methyl-8-chloro-1H-4,5-dihydro-1,2,5-benzotriazepine, 3 - amino-4-oxo-5-methyl-8-chloro-1H-4,5-dihydro-1,2,5-benzotriazepine.

What we claim is:

1. A compound of the formula (a)

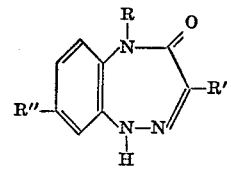

in which R represents hydrogen, alkyl of 1 to 6 carbon atoms, phenyl, tolyl, xylyl, benzyl, phenethyl, cyclopentyl or cyclohexyl, R' represents halogen, hydrogen, a carboxyl group—free or esterified by an alkanol having 1 to 4 carbon atoms, cyano, S—X wherein S—X is a mercapto selected from the group consisting of methyl-mercapto, ethylmercapto, propyl-mercapto, phenylmercapto, benzylmercapto, phenethylmercapto, dimethylaminoethylmercapto, 2-pyrrolidino-ethylmercapto, 3 - piperidinopropylmercapto, carboxymethylmercapto, carboxyethylmercapto and carbethoxymethylmercapto,

wherein $Z_1$ represents hydrogen, methyl or ethyl, lower alkoxy carbonyl, or acetyl or propionyl and $Z_2$ represents hydrogen, or methyl or ethyl, or $R^1$ represents

wherein Y represents hydrazino, phenylhydrazino or guanidino, unsubstituted amino, lower alkyl amino or dilower alkyl amino and R'' represents hydrogen, hydroxy, methoxy, nitro, a carboxyl group esterified by an alkanol having 1 to 3 carbon atoms, halogen or trifluoromethyl, or (b) a therapeutically acceptable acid addition salt thereof.

2. A compound according to claim 1 wherein R and R'' are as defined as in claim 1 and R' represents hydrogen, cyano or a carboxylic group free or esterified with an alkanol having from 1 to 4 carbon atoms.

3. A compound of the formula

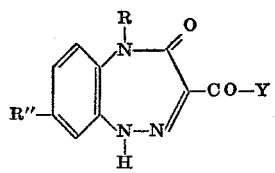

wherein R and R'' are as defined as in claim 1 and Y is selected from the group consisting of amino, lower alkyl amino, dilower alkyl amino, hydrazino, phenyl hydrazino, or guanidino.

4. A compound of the formula

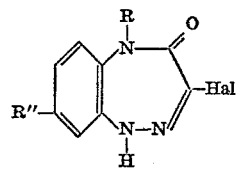

wherein R and R'' have the same meanings as defined in claim 1 and Hal represents halogen.

5. A compound of the formula (a)

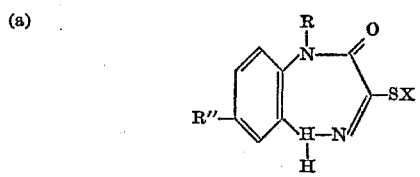

in which R represents hydrogen, alkyl of 1 to 6 carbon atoms, phenyl, tolyl, xylyl, benzyl, phenethyl, cyclopentyl or cyclohexyl, X is selected from the group consisting of lower alkyl, phenyl, lower alkyl phenyl, phenyl-lower alkyl, lower alkoxy carbonyl-lower alkyl, carboxy lower alkyl, lower alkylamino lower alkyl, dilower alkyl amino lower alkyl, pyrrolidino lower alkyl and piperidino lower alkyl, R'' represents hydrogen, hydroxy, methoxy, nitro, carbonyl group esterified by an alkanol having 1 to 3 carbon atoms, halogen or trifluoromethyl, or (b) a therapeutically acceptable acid addition salt thereof.

6. A compound of the formula

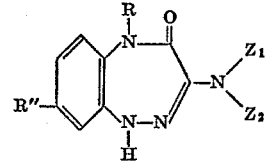

in which R represents hydrogen, alkyl of 1 to 6 carbon atoms, phenyl, tolyl, xylyl, benzyl, phenethyl, cyclopentyl or cyclohexyl $Z_1$ represents hydrogen, lower alkyl, lower alkoxy carbonyl acetyl or propionyl and $Z_2$ represents hydrogen or lower alkyl, and R'' represents hydrogen, hydroxy, methoxy, nitro, carboxyl group esterified by an alkanol having 1 to 3 carbon atoms, halogen or a trifluoromethyl, or (b) a therapeutically acceptable acid addition salt thereof.

7. A process for the production of a compound according to claim 2, which comprises the steps (a) reacting an N-carbalkoxyacetyl or N-cyanacetyl o-phenylene diamine of the formula

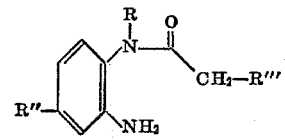

wherein R and R''' have the meanings defined in claim 2, and R''' represents cyano or a carboxylic group esterified by an alkanol having from 1 to 4 carbon atoms with a nitrosating agent to form the corresponding diazonium salt (b) and cyclising at a pH value greater than 4 the said diazinoum salt into 3-cyano or 3-carbalkoxy 4-oxo 1H 4,5-dihydro 1,2,5-benzotriazepine having the formula,

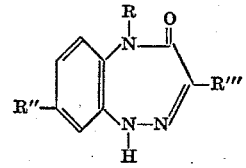

in which the substituents R, R'' and R''' have the same meaning as above.

8. A process for the production of a compound according to claim 2, in which the further step of decarboxylating the 3-carboxy compound is effected so as to form a 4-oxo 1H 4,5-dihydro 1,2,5-benzotriazepine compound of the formula

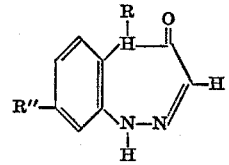

wherein the substituents R and R'' are as defined in claim 2.

9. A process for the production of a compound according to claim 3, which comprises the steps of
(a) reacting an N-carboalkoxyacetyl o-phenylene diamine of the formula

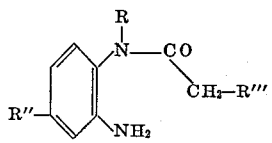

wherein the substituents R and R'' are as defined in claim 24 and R''' represents a carboxylic group esterified by an alkanol having from 1 to 4 carbon atoms with a nitrosating agent, to form the corresponding diazonium salt (b) cyclising the said diazonium salt at a pH value greater than 4 into a 3-carbalkoxy 4-oxo 1H 4,5-dihydro 1,2,5-benzotriazepine having the formula

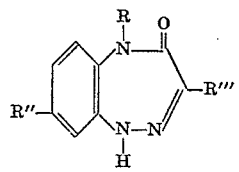

wherein the substituents R, R'' and R''' have the above stated meanings (c) reacting the latter with an amino reagent selected from the group consisting of primary amine, secondary amine, hydrazine, phenyl hydrazine and guanine to obtain a 4-oxo 1H 4,5-dihydro 1,2,5-benzotriazepine having the formula

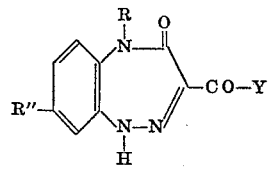

wherein the substituents R, R'' and Y are as defined in claim 3.

10. A process for the production of a compound according to claim 4, which comprises the steps of
(a) reacting an N-carbalkoxyacetyl or N-cyanacetyl o-phenylene diamine of the general formula

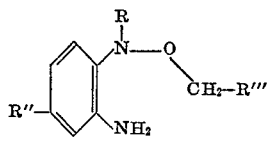

wherein R and R'' are as defined in claim 4 and R''' represents cyano or a carboxylic group esterified by an alkanol having from 1 to 4 carbon atoms, with a nitrosating agent to form the corresponding diazonium salt, cyclising at a pH value greater than 4 the said diazonium salt into 3-cyano or 3-carbalkoxy 4-oxo 1H 4,5-dihydro 1,2,5-benzotriazepine having the formula

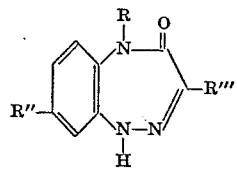

in which the substituents R, R'' and R''' are as defined above, (b) hydrolysing the latter in acidic or alkaline medium into a 3-carboxy 4-oxo 1H-4,5-dihydro 1,2,5-benzotriazepine compound, (c) submitting the latter to the action of a halogenation agent either directly or after decarboxylation to obtain a 3-halogeno 4-oxo 1H 4,5-dihydro 1,2,5-benzotriazepine having the formula

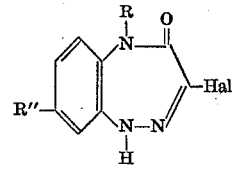

wherein R and R'' have the above stated meanings and Hal is a halogen atom.

11. A process for the production of a compound according to claim 4, in which a 3-chloro compound of the formula

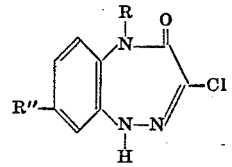

wherein R and R'' are as defined in claim 4 is reacted with an alkali metal iodide to form the corresponding 3-iodo compound.

12. A process for the production of a compound according to claim 5, which comprises the steps of
(a) reacting an N-carbalkoxyacetyl or N-cyanacetyl o-phenylene diamine of the formula

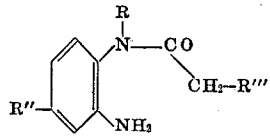

wherein R and R'' are as defined in claim 5 and R''' represents cyano or a carboxylic group esterified by an alkanol having from 1 to 4 carbon atoms with a nitrosating agent to form the corresponding diazonium salt, cyclising at a pH value greater than 4 the said diazonium salt into 3-cyano or 3-carbalkoxy 4-oxo 1H 4,5-dihydro 1,2,5-benzotriazepine having the formula

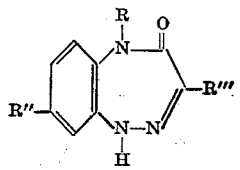

in which the substituents R, R'' and R''' are as defined above, (b) hydrolysing the latter in acidic or alkaline medium into a 3-carboxy 4-oxo 1H 4,5-dihydro 1,2,5-benzotriazepine compound, (c) halogenating the latter with a halogenation agent selected from the group consisting of bromine, iodine, halogenated derivative of phosphorus, sulfuryl chloride and N-halogeno succinimide either directly or after decarboxylation to obtain a 3-halogeno 4-oxo 1H 4,5-dihydro 1,2,5-benzotriazepine having the formula

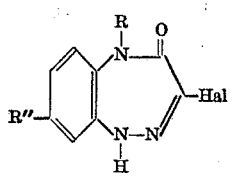

wherein R and R'' have the above stated meanings and Hal is a halogen atom, (d) reacting the said 3-halogeno compound with a mercapto derivative of formula HSX, wherein X is as defined in claim 5 to obtain a 3-mercapto 4-oxo 1H 4,5-dihydro 1,2,5-benzotriazepine of the formula

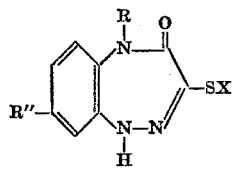

wherein the substituents R, R" and X have the above stated meanings.

13. A process for the production of a 1,2,5-benzotriazepine compound according to claim 6, which comprises the steps of
(a) reacting an N-carbalkoxyacetyl or N-cyanacetyl o-phenylene diamine of the formula

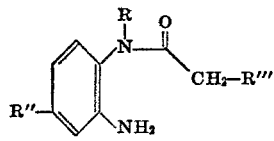

wherein R and R" are as defined in claim 6 and R''' represents cyano or a carboxylic group esterified by an alkanol having from 1 to 4 carbon atoms with a nitrosating agent to form the corresponding diazonium salt, cyclising at a pH value greater than 4 the said diazonium salt into 3-cyano or 3-carbalkoxy 4-oxo 1H 4,5-dihydro 1,2,5-benzotriazepine having the general formula

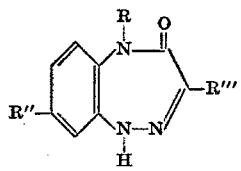

in which the substituents R, R" and R''' are as defined above,
(b) hydrolysing the latter in acidic or alkaline medium into a 3-carboxy 4-oxo 1H-4,5-dihydro 1,2,5-benzotriazepine compound,
(c) halogenating the latter with a halogenation agent either directly or after decarboxylation to obtain a 3-halogeno 4-oxo 1H 4,5-dihydro 1,2,5-benzotriazepine having the formula

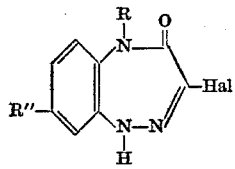

wherein R and R" have the above stated meanings and Hal is a halogen atom
(d) reacting the said 3-halogeno compound with ammonia, a primary or secondary amine, an amide or a urethane to obtain a 3-amino 4-oxo 1H 4,5-dihydro 1,2,5-benzotriazepine of the formula

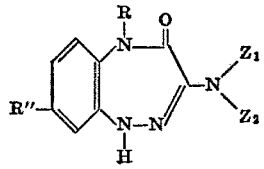

wherein the substituents R, R", $Z_1$ and $Z_2$ are as defined in claim 6.

14. A process according to claim 7, wherein the nitrosating agent is selected from the group consisting of
(a) an alkali-metal nitrite in the presence of a mineral acid;
(b) nitrous anhydride in aqueous medium;
(c) nitric oxide; and
(d) an alkyl ester of nitrous acid.

15. A process for the production of a compound according to claim 2, which comprises the steps
(a) reacting an N-carbalkoxyacetyl or N-cyanacetyl o-phenylene diamine of the formula

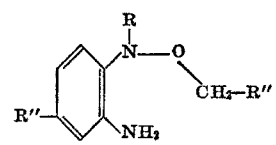

wherein R and R" are as defined in claim 2 and R''' represents a carboxylic acid alkyl ester in which said alkyl has 1 to 4 carbon atoms with a nitrosating agent to form the corresponding diazonium salt,
(b) cyclising at a pH value greater than 4 the said diazonium salt into 3-cyano or 3-carbalkoxy 4-oxo 1H 4,5-dihydro 1,2,5-benzotriazepine having the formula

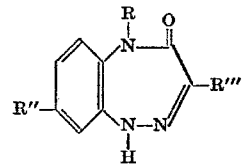

in which the substituents R, R" and R''' are as defined above,
(c) and hydrolysing the latter in acidic or alkaline medium into a 3-carboxy 4-oxo 1H-4,5-dihydro 1,2,5-benzotriazepine compound.

16. A process according to claim 7, wherein the diazotation reaction is effected between —5 and +5° C.

17. A process according to claim 7, wherein the cyclization reaction is effected in the reaction medium of the diazotation reaction, without recourse to the isolation of the diazonium salt.

References Cited

Chemical Abstracts, vol. 20, p. 745 (1925).
Abstracting Guha et al.: "Quart J. Indian Chemical Soc," vol. 2, pp. 83–94 (1925).

HENRY R. JILES, Primary Examiner
R. T. BOND, Assistant Examiner

U.S. Cl. X.R.
260—141, 562 R, 465 D, 379, 578; 424—244

Disclaimer 3,736,316.—*Silvano Rossi*, Milan, Italy. 1,2,5-BENZOTRIAZEPIN-4-ANES AND THEIR PREPARATION. Patent dated May 29, 1973. Disclaimer filed Sept. 8, 1972, by the assignee, *Roussel UCLAF*.

Hereby disclaims the portion of the term of the patent subsequent to Oct. 17, 1989.

[*Official Gazette October 30, 1973.*]